United States Patent [19]

Maekawa

[11] Patent Number: 5,703,410
[45] Date of Patent: Dec. 30, 1997

[54] CONTROL SYSTEM FOR ENGINE GENERATOR

[75] Inventor: Hirotoshi Maekawa, Tokyo, Japan

[73] Assignee: Mitsubishi Denki Kabushiki Kaisha, Tokyo, Japan

[21] Appl. No.: 569,986

[22] Filed: Dec. 8, 1995

[30] Foreign Application Priority Data

Jan. 18, 1995 [JP] Japan ................................. 7-005622

[51] Int. Cl.$^6$ ................................................. H02P 9/04
[52] U.S. Cl. .................... 290/40 C; 322/29; 123/339.16
[58] Field of Search ............................ 290/40 C, 40 A; 123/399, 339.16, 339.19

[56] References Cited

U.S. PATENT DOCUMENTS

| | | | |
|---|---|---|---|
| 4,611,560 | 9/1986 | Miyazaki et al. | 123/339.17 |
| 5,170,065 | 12/1992 | Shimizu et al. | 290/40 C |
| 5,256,959 | 10/1993 | Nagano et al. | 322/25 |
| 5,270,575 | 12/1993 | Togai et al. | 290/40 C |
| 5,467,008 | 11/1995 | Uchinami | 322/27 |

FOREIGN PATENT DOCUMENTS

| | | |
|---|---|---|
| 4297330 | 10/1992 | Japan . |
| 5146200 | 6/1993 | Japan . |

*Primary Examiner*—Clayton E. Laballe
*Assistant Examiner*—Nicholas Ponomarenko
*Attorney, Agent, or Firm*—Sughrue, Mion, Zinn, Macpeak & Seas, PLLC

[57] ABSTRACT

A control system for an internal combustion engine equipped with an engine generator suppresses fluctuation and pulsation of rotation number of a crank shaft to realize optimal engine operation, enhanced fuel-cost performance and improved exhaust gas purification. An electronic controller for controlling an exciting current of the engine generator and an actuator for a throttle valve includes a unit for determining and storing a desired output power of the engine generator for a load voltage, a unit for determining and storing a desired torque of the engine generator as demanded for generating the desired output power on the basis of the load voltage and a rotation number of the crank shaft, a unit for arithmetically determining an exciting current required for making the demanded torque of the generator coincide with the desired torque, and a unit for driving an excitation coil assembly with the exciting current as determined. By controlling the demanded torque of the engine generator to be constant, the output power thereof is controlled to be constant while allowing the engine to operate at the rotation number which ensures a maximum output efficiency for the engine.

10 Claims, 11 Drawing Sheets

CONTROL SYSTEM FOR ENGINE GENERATOR

BACKGROUND OF THE INVENTION

1. Field of the Invention

The present invention generally relates to a control system for an engine generator for controlling an output power of the engine generator to be constant by suppressing fluctuation or variation of the rotating speed of an internal combustion engine (hereinafter also referred to simply as the engine). More particularly, the present invention is concerned with a control system for an engine generator for controlling a demanded torque (or torque demand, to say in another way) of the engine generator to be constant by controlling an exciting current of the generator on the basis of a rotation speed (or rotation number in rpm) of a crankshaft of the engine and a load voltage so that the demanded torque of the generator remains constant to thereby realize optimization of the engine operation efficiency, reduction of noise and improvement of the fuel-cost performance as well as that of an exhaust gas capability.

2. Description of Related Art

For having better understanding of the present invention, technical background thereof will be reviewed in some detail.

FIG. 14 is a block diagram showing schematically a general arrangement of a conventional control system for an engine generator which is disclosed, for example, in Japanese Unexamined Patent Application Publication No. 297330/1992 (JP-A-4-297330). Referring to the figure, a control unit 1 constituting a part of an electronic controller 30 is designed to control the opening degree of a throttle valve 4 and hence an amount or quantity of an intake air to be supplied to an engine 6 in response to an output signal C delivered from an arithmetic unit 13, the function of which will be described later on. On the other hand, a driving unit 2 supplies a driving voltage (DC voltage) commanded by the output signal C of the arithmetic unit 13 to an actuator 3 under the control of the control unit 1.

The actuator 3 drives a throttle valve 4 in accordance with the DC voltage signal supplied from the driving unit 2. In this way, the opening degree of the throttle valve 4 is controlled by the actuator 3, whereby the amount or quantity of intake air (hereinafter referred to also as the intake air quantity) supplied to the engine 6 is regulated. A retarding spring 5 generates a retarding torque for fixing the opening degree of the throttle valve 4 at the position where the retarding torque is in balance with the driving torque of the actuator 3. Parenthetically, so long as the actuator 3 is not operated, the throttle valve 4 remains in a fully closed state.

The rotation speed (rpm) of a crank shaft of the engine 6 is controlled in dependence on the intake air quantity fed to the engine 6 which quantity in turn is controlled in dependence on the opening degree of the throttle valve 4.

An engine generator 7 implemented in the form of a three-phase synchronous magneto generator includes a three-phase coil assembly of a rotor (not shown) which is operatively coupled to an output shaft of the engine 6 and an excitation coil assembly of a stator (not shown either) and generates a high-frequency voltage of a three-phase sinusoidal waveform as an output voltage Vg, which then undergoes a full-wave rectification by a rectifier circuit 8 to be converted to a DC load voltage Vd.

An inverter circuit 9 serving as a load for the engine generator 7 converts the load voltage Vd supplied from the rectifier circuit 8 back to a sinusoidal voltage of a commercial frequency, which voltage is then supplied to other loads such as electric machines, instruments and other equipment (not shown) mounted on a motor vehicle.

Further, the load voltage Vd is also supplied to an onboard battery mounted on the motor vehicle and constituting a power supply source. The load voltage Vd assumes a voltage value corresponding to a synthesized resistance value of the loads.

A comparison/arithmetic unit 11 which generates the output signal C as a command to the control unit 1 is composed of a comparator 12 for comparing a detected value of the load voltage Vd outputted from the rectifier circuit 8 (thus corresponding to the output voltage of the engine generator 7) with a preset reference voltage Vr and an arithmetic unit 13 for arithmetically determining and generating the control signal C on the basis of the result of the comparison performed by the comparator 12.

At this juncture, it should be mentioned that there are provided a variety of sensors for making available various information signals indicative of operation states of the engine 6 and a conventional engine control apparatus for controlling the amount or quantity of a fuel injected to the engine 6 as well as the ignition timing and others in dependence on the running conditions of the engine 6.

The electronic controller 30 constituted by the control unit 1, the driving unit 2 and the comparison/arithmetic unit 11 is also in charge of controlling the engine control apparatus on the basis of the various information mentioned above.

FIG. 15 is a circuit diagram showing an exemplary circuit configuration of the electronic controller 30. Referring to the figure, the comparison/arithmetic unit 11 is comprised of an operational amplifier OP1 for fetching the preset reference voltage Vr, input resistors R1, R2 and R3 and a feedback resistor R4 of the operational amplifier OP1, an operational amplifier OP3 for fetching the load voltage Vd, an input resistor R7 and a feedback resistor R8 of the operational amplifier OP3. The output signal of the operational amplifier OP3 is inputted to the operational amplifier OP1 via the input resistor R2.

On the other hand, the driving unit 2 is comprised of an operational amplifier OP2 having one input terminal to which an output signal of the operational amplifier OP1 is applied, an input resistor R5 and a feedback resistor R6. The output signal of the operational amplifier OP2 is inputted to the operational amplifier OP1 via the input resistor R3.

Furthermore, the output signal of the operational amplifier OP2 incorporated in the driving unit 2 is supplied to the actuator 3 which has an output shaft coupled operatively to the throttle valve 4 mounted rotatably within an intake pipe of the engine 6.

Next, description will turn to operation of the conventional control apparatus for the engine generator shown in FIGS. 14 and 15.

In general, the synthesized resistance value of the loads including the battery and the inverter circuit 9 is on the order of 8 Ω on the presumption that the output power Pg of the generator 7 is 20 kW, the load voltage Vd is 400 V and that the load current is 50 A. However, the above-mentioned resistance value will vary in dependence on the battery charge state, operation states of the electric fittings or the like. A change in the load resistance value involves a corresponding change in the load voltage Vd and hence a change in the torque demanded by the generator 7. Thus, the load imposed on the engine will ultimately undergo a corresponding change.

The output voltage Vg of the generator 7 depends on the load inclusive of the inverter circuit 9. Consequently, unless the control of the rotation number of the crank shaft is performed through the output power control of the generator 7 and the opening/closing control of the throttle valve 4, the rotation number of the crank shaft will vary as the load changes.

In case the rotation number of the crank shaft should vary remarkably in response to a change of the load, it becomes impossible to continue operation of the engine with high efficiency and to maintain the output power Pg of the generator 7 at a constant level, giving rise to a serious problem.

To cope with the problem mentioned above, the opening degree of the throttle valve 4 is controlled by the electronic controller 30 in dependence on the load voltage Vd which varies as the engine load varies, to thereby change correspondingly the intake air quantity of the engine 6, in order to ensure a high-efficiency operation of the engine 6 by controlling the rotation number of the crank shaft so that it falls within a range of 2000 rpm to 2500 rpm on the presumption that the exciting current supplied to the excitation coil of the generator 7 is controlled to be constant.

More specifically, the electronic controller 30 detects the load voltage Vd to compare it with the preset reference voltage Vr to thereby generate the output signal C, the value of which is arithmetically determined on the basis of the result of the comparison to drive the actuator 3 by using the output signal C for thereby controlling the opening degree of the throttle valve 4 in an effort to suppress variation of the rotation speed (rpm) of the engine 6 while maintaining the output power to be constant.

In that case, the control unit 1 drives the actuator 3 by way of the driving unit 2 in accordance with the output signal C outputted from the arithmetic unit 13 of the comparison/arithmetic unit 11.

Thus, the actuator 3 generates a driving torque corresponding to the DC voltage supplied from the driving unit 2 to thereby control the intake air quantity by manipulating correspondingly the throttle valve 4.

In that case, the retarding torque of the retarding spring 5 acting on the actuator 3 changes in dependence on the angle of rotation of the throttle valve 4. Thus, the rotation of the throttle valve 4 is stopped in the state where the retarding torque is in balance with the driving torque. In this manner, the rotation number of the crank shaft is controlled to be constant by controlling the opening degree of the throttle valve 4 by changing the driving torque of the actuator 3 to thereby regulate correspondingly the flow rate of the intake air (fuel gas) supplied to the engine 6.

Now, let's assume that the load voltage Vd increases beyond the preset reference voltage Vr. This means that the load decreases and thus the demand torque of the generator 7 is small. Accordingly, the opening degree of the throttle valve 4 is so controlled as to decrease to thereby suppress the rotation number of the crank shaft from increasing.

On the contrary, when the load voltage Vd becomes lower than the preset reference voltage Vr, this means that the load increases and thus the demanded torque of the generator 7 increases. Accordingly, the opening degree of the throttle valve 4 is so controlled as to increase for thereby suppressing the rotation number of the crank shaft from decreasing.

The rotation output of the engine 6 is derived as the rotation energy or power of the output shaft thereof. Thus, the generator 7 connected to the output shaft generates an output voltage Vg in dependence on the rotation number of the crank shaft. The output voltage Vg of the generator 7 is converted to the load voltage Vd through the rectifier circuit 8 to be subsequently supplied to the loads including the battery. Further, the load voltage Vd is converted back to a sinusoidal voltage of a commercial frequency (i.e., AC power equivalent to the commercial power supply) to be supplied to other loads such as electric equipment of the motor vehicle.

The comparison/arithmetic unit 11 incorporated in the electronic controller 30 detects the load voltage Vd corresponding to the output voltage Vg of the generator 7 by a load voltage detecting means which may be constituted by a voltage divider circuit (not shown) connected to the rectifier circuit 8, wherein the load voltage Vd is compared with the preset reference voltage Vr by the comparator 12.

The arithmetic unit 13 incorporated in the comparison/arithmetic unit 11 performs predetermined arithmetic operations on the basis of the result of the comparison performed by the comparator 12, the result of the arithmetic operation being supplied to the control unit 1 as the output signal C.

More specifically, the load voltage Vd is inputted to the preceding operational amplifier OP3 incorporated in the comparison/arithmetic unit 11 via an input resistor R7 (refer to FIG. 15), whereby an amplified output signal is inputted to the succeeding operational amplifier OP1 from the operational amplifier OP3.

The operational amplifier OP1 has an input terminal supplied with the preset reference voltage Vr via the input resistor R1 and the other input terminal to which the output signal of the operational amplifier OP2 incorporated in the driving unit 2 is fed back via the input resistor R3. Thus, the load voltage Vd and the preset reference voltage Vr are compared with each other by the operational amplifier OP1.

Now, let's assume, by way of example, that the driving voltage for the actuator 3 is lowered in accordance with the above-mentioned result of the comparison. In that case, the throttle valve 4 is driven in the direction toward the closed state, as a result of which the rotation number of the crank shaft of the engine 6 decreases, which leads ultimately to lowering of the output power of the generator 7.

In this manner, the comparison/arithmetic unit 11 performs arithmetic operation on the basis of the output voltage Vg of the engine generator 7 to thereby generate the output signal C representing the result of the arithmetic operation. In response to the output signal C, the control unit 1 controls the opening degree of the throttle valve 4 to thereby control the rotation number or rotation speed (rpm) of the crank shaft of the engine 6.

Thus, it is safe to say that the rotation speed (rpm) of the crank shaft of the engine 6 is controlled in dependence on the change of the load voltage Vd which corresponds to the output voltage Vg of the engine generator 7.

In the case of the hitherto known controller for the engine generator, the rotation speed or number of the crank shaft of the engine 6 is controlled by changing the opening degree of the throttle valve 4 upon occurrence of fluctuation or change in the load voltage Vd with the exciting current of the engine generator 7 being maintained to be constant. Consequently, rapid change of the opening degree of the throttle valve 4 results in a steep change in the amount or quantity of the intake air, presenting a great obstacle in realizing a satisfactory purification of the exhaust gas, thus giving rise to a problem.

Besides, since the throttle valve 4 is controlled after detection of the change of the load voltage Vd, change of the intake air quantity as brought about by the control of the opening degree of the throttle valve 4 is accompanied with a significant time lag for the change of the demanded torque of the generator 7. Consequently, a quiescent period or dead time of the control system intervenes between the detection of change of the load voltage Vd and the corresponding change of the actual intake air quantity, as a result of which the rotation number of the crank shaft suffers pulsation due to occurrence of a so-called hunting phenomenon, providing a difficulty in controlling the rotation speed or number of the crank shaft to be constant, to another disadvantage.

SUMMARY OF THE INVENTION

In the light of the state of the art described above, it is an object of the present invention to provide a control system for an engine generator which allows the rotation speed of the crank shaft to be maintained so that the engine generator can be driven at an optimal rotation speed for generating a constant electric power without need for changing practically the opening degree of the throttle valve regardless of variation in the load voltage so long as the engine generator can output the rated power, for thereby operating the engine at the rotation speed of the crank shaft which can ensure a maximum engine operation efficiency, realization of optimization of the engine operation efficiency, noise reduction, improvement of the fuel cost performance and improved exhaust gas purification capability.

Another object of the present invention is to provide a control system for an engine generator which makes it possible to control the opening/closing of the throttle valve at a constant rate for thereby improving the fuel cost performance of the engine as well as purification of the exhaust gas in a facilitated manner.

In view of the above and other objects which will become apparent as the description proceeds, there is provided according to a general aspect of the present invention a control system for an engine generator, which system includes a throttle valve for regulating a quantity of intake air supplied to an internal combustion engine, an engine control means for controlling a quantity of fuel to be injected to the engine and an ignition timing therefor, an actuator for adjusting an opening degree of the throttle valve, a rectifier circuit for rectifying an output voltage of the engine generator to thereby produce a DC load voltage, a load supplied with an output power of the engine generator under application of the load voltage, and an electronic controller for controlling an exciting current of the engine generator, the engine control means and the actuator on the basis of various information indicative of operation states of the engine. The various information contains at least information concerning a load voltage which depends on resistance of the load and information concerning a rotation speed or number of the engine. The electronic controller includes a desired output power setting means for determining a desired output power of the engine generator for a given load voltage and storing the desired output power as map data, a desired torque setting means for determining a desired torque demanded by the engine generator required for generating the desired output power on the basis of the load voltage and the crank shaft rotation number and storing the desired torque as map data, an exciting current arithmetic means for arithmetically determining an exciting current of the engine generator so that a demanded torque of the generator coincides with the desired torque, and an exciting current control means for driving an excitation coil assembly of the engine generator with the excitation current. The demanded torque of the engine generator is controlled to be constant at the desired torque to thereby control the output power of the generator to be constant at the desired output power while allowing the engine to operate at a rotation number of the crank shaft at which a maximum output efficiency of the engine can be ensured.

With the arrangement of the engine generator control system described above, a constant torque control of the engine generator can be realized such that the output power of the engine generator coincides with the desired output power by controlling the exciting current supplied to the engine generator on the basis of the load voltage and the rotation number or speed of the crank shaft even when the output voltage of the engine generator changes in dependence on the status of load, so long as the engine generator is in the state capable of generating the rated power. Thus, the torque required to be generated by the engine can be controlled to be constant without need for controlling the throttle valve. Further, by controlling the demanded torque of the engine generator to be constant to thereby suppress fluctuation or variation of the engine rotation speed, optimization of the engine operation efficiency, enhanced fuelcost performance and improved exhaust gas purification can be realized without encountering any appreciable difficulty.

In a preferred mode for carrying out the invention, the electronic controller may include an exciting current detecting means for detecting an exciting current to be supplied to the engine generator, and an exciting current correcting means for correctively adjusting finely the exciting current on the basis of a difference between the detected value of the exciting current and the arithmetically determined value thereof.

By performing the fine adjustment of the exciting current on the basis of the difference between the detected value of the exciting current and the calculated value thereof, temperature ascribable drift of resistance value of the excitation coil can be compensated for.

In another preferred mode for carrying out the invention, the electronic controller may include a load change decision means for making decision whether the output power of the engine generator is higher than a rated power inclusive thereof by deciding whether the load voltage lies within a predetermined range, and an ignition timing correcting means for correctively controlling the ignition timing of the engine so that the rotation speed of the crank shaft coincides with a desired rotation speed when it is decided that the load voltage is outside of the predetermined range and that the output power of the generator fails to reach the rated power.

By virtue of the arrangement described above, the ignition timing of the engine is corrected with an angle of advance or lag so that the rotation speed of the crank shaft coincides with the desired rotation speed, even in the case where the difference between the desired torque and the demanded torque of the engine generator is not zero in the strict sense. Thus, the rotation speed (rpm) of the engine crank shaft can be maintained so that the engine generator operates with optimal efficiency independent of accuracy of the data used for interpolation, whereby the point operation of the engine at which the engine operation efficiency is at maximum can be maintained to thereby allow a constant output power to be generated by the engine generator.

In yet another preferred mode for carrying out the invention, the electronic controller may include a load change decision means for making decision whether the output power of the engine generator is higher than a rated power inclusive thereof by deciding whether the load voltage lies within a predetermined range, and a throttle opening degree correcting means for correctively controlling an opening degree of the throttle valve in a direction in which the opening degree of the throttle valve is decreased so that the rotation speed of the crank shaft coincides with a desired rotation speed, when it is decided that the load voltage is outside of the predetermined range and that the output power of the engine generator fails to reach the rated power.

Owing to the arrangement described above, pulsation of the engine rotation speed can satisfactorily be suppressed to thereby allow the engine to be operated with high efficiency while suppressing pulsation of the engine rotation speed, even when the output power of the engine generator can not reach the rated power due to fluctuation of the load voltage, which is also favorable from the viewpoint of exhaust gas purification.

In a further preferred mode for carrying out the invention, the electronic controller may include an output torque estimating means for estimating an output torque of the engine on the basis of the information concerning the opening degree of the throttle valve and the boosted pressure (intake manifold pressure), and a desired opening degree determining arithmetic means for determining the desired opening degree of the throttle valve through interpolation based on a relation between the demanded torque of the engine generator and the output torque of the engine. The opening degree correcting means may be so implemented as to control the opening degree of the throttle valve toward the desired opening degree so that the rotation speed of the crank shaft coincides with the desired rotation speed, when the output power of the engine generator fails to reach the rated power.

By taking into account the time lag in the intake air feeding for thereby deceasing the output power of the engine generator after lapse of a predetermined time, the opening degree of the throttle valve can be controlled in the direction in which it is closed in precedence to lowering of the demanded torque of the engine generator, whereby pulsation of the engine rotation speed can be suppressed. Thus, there can be realized high operation efficiency of the engine and the generator as well as reduction of noise and improved exhaust gas purification performance.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
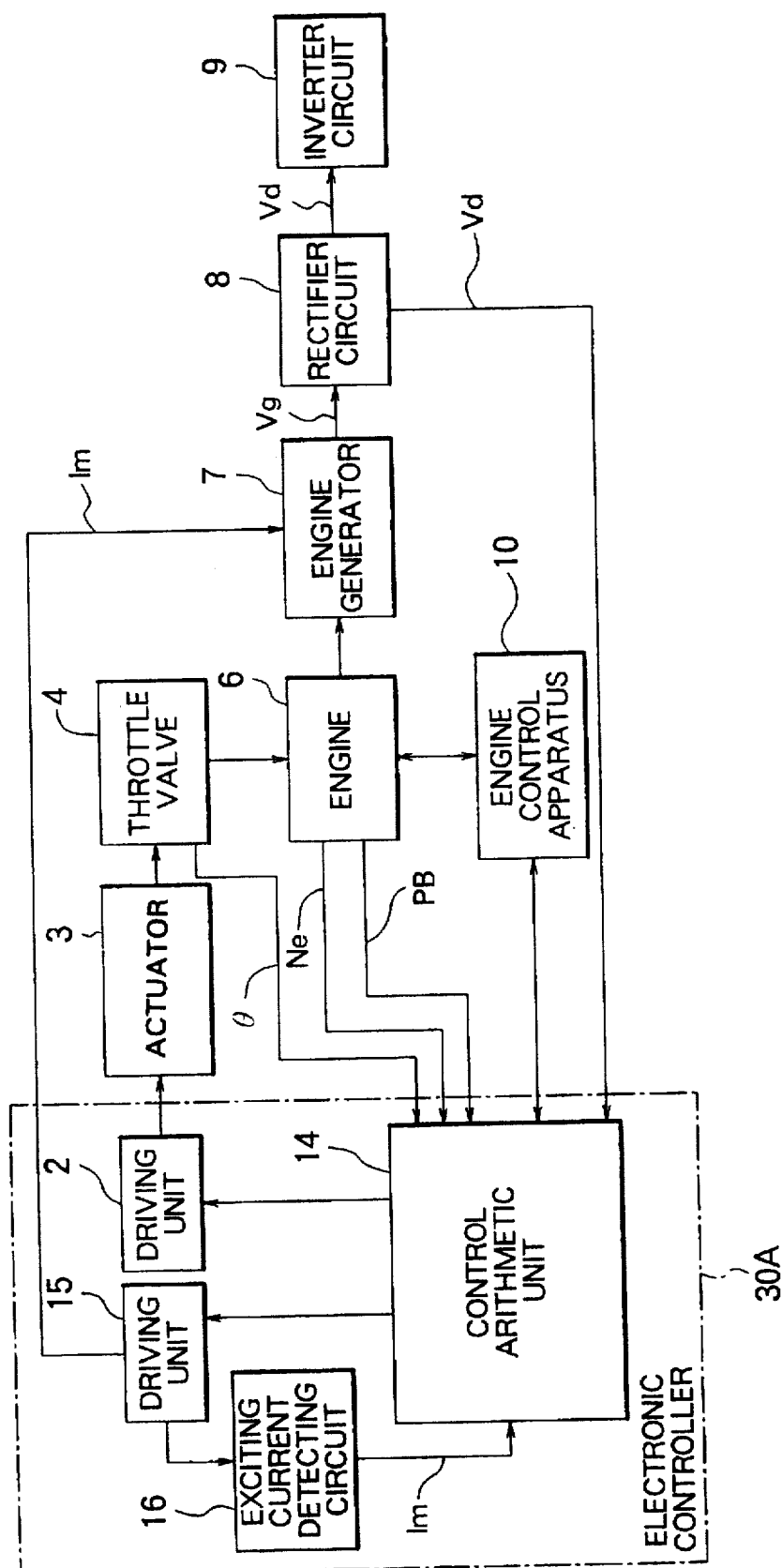
FIG. 1 is a block diagram showing schematically and generally a structure of a control system for an engine generator according to the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

FIG. 1 is a block diagram showing generally a structure of an engine generator control system according to a first embodiment of the present invention. It should first be mentioned that the driving unit 2, the actuator 3, the throttle valve 4, the engine 6, the engine generator 7, the rectifier circuit 8 and the inverter circuit 9 serve the same or equivalent functions same as or equivalent to those described hereinbefore in conjunction with the conventional engine generator.

Referring to the figure, an electronic controller 30A has a structure corresponding to the electronic controller 30 described hereinbefore. As the input information to the electronic controller 30A, there may be mentioned the opening degree θ of the throttle valve 4, the rotation speed or number Ne of the crank shaft, a boosted pressure (intake manifold pressure) PB of the engine and the load voltage Vd.

In the case of the engine generator control system now under consideration, a DC brushless motor is employed as the actuator 3 with a view to enhancing the maintenance facility and the reliability. The actuator 3 is designed to generate a driving torque of a magnitude which is in proportion to a three-phase current supplied from the driving unit 2 to thereby operate correspondingly the throttle valve 4 of the engine 6.

The driving unit 2 for the actuator 3 is constituted by a full-wave rectification bridge circuit implemented by using power FETs (field effect transistors).

The opening degree θ of the throttle valve 4 is detected by an opening degree sensor which may be constituted, for example, by a variable resistor, as described later on, wherein the output signal of the opening degree sensor is inputted to the control arithmetic unit 14 of the electronic controller 30A.

The engine control apparatus 10 responds to the control signal issued from the control arithmetic unit 14 to thereby control the fuel injection quantity and the ignition timing while correcting the ignition timing as occasion requires.

A communication path is established between the engine control apparatus 10 and the control arithmetic unit 14 for allowing data transfer therebetween.

A control arithmetic unit 14 which may be realized by a microcomputer is provided to perform the functions corresponding to those of the control unit 1 and the comparison/arithmetic unit 11. More specifically, the control arithmetic unit 14 detects the opening degree θ of the throttle valve 4, the rotation number (speed) Ne of the crank shaft of the engine 6, the load voltage Vd and the exciting current Im of the engine generator 7 to thereby control the opening degree θ of the throttle valve 4, the exciting current Im of the engine generator 7, the fuel injection quantity and the ignition timing of the engine 6 and others.

The signal indicating the opening degree θ of the throttle valve 4 is fed back to the control arithmetic unit 14 to be processed thereby for controlling the intake air quantity of the engine 6 in a desired manner.

Further, a spring (not shown) is provided in association with the throttle valve 4 for urging the throttle valve 4 toward the fully closed state thereof upon shutdown of the power supply. This arrangement realizes a fail-safe function in the sense that upon occurrence of a fault in the actuator 3, the throttle valve 4 is closed fully to thereby stop the operation of the engine 6.

The driving unit 15 responds to a control signal issued from the control arithmetic unit 14 to supply an exciting current Im to the generator 7. An exciting current detecting circuit 16 is provided for detecting the exciting current Im via the driving unit 15, wherein the detection output signal of the exciting current detecting circuit 16 is inputted to the control arithmetic unit 14.

The driving unit 2 for the actuator 3, the control arithmetic unit 14, the driving unit 15 for supplying the exciting current Im and the exciting current detecting circuit 16 are incorporated in the electronic controller 30A.

Figure 2:
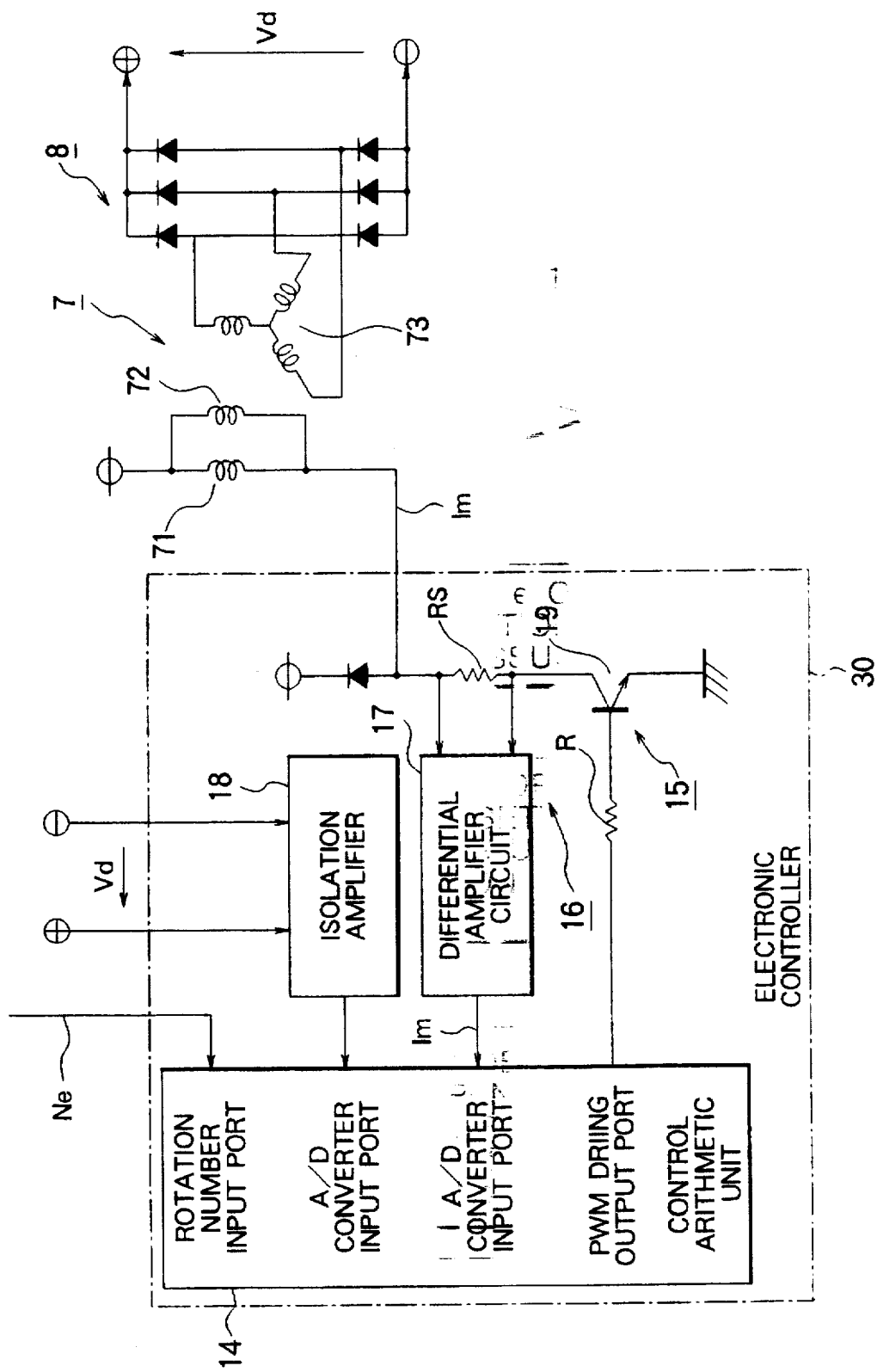
FIG. 2 is a circuit block diagram showing exemplary configurations of an electronic controller and an engine generator according to a first embodiment of the invention shown in FIG. 1.

FIG. 2 is a circuit block diagram showing exemplary configurations and interconnections of the engine generator 7, the rectifier circuit 8, the control arithmetic unit 14, the driving unit 15 and the exciting current detecting circuit 16 shown in FIG. 1.

Referring to FIG. 2, the engine generator 7 includes excitation coils 71 and 72 which are connected in parallel and supplied with the exciting current Im and a stator coil 73. The excitation coils 71 and 72 of the generator 7 undergo a PWM (pulse-width modulation) control of the driving unit 15 so that the output power Pg and the demanded torque Tg of the generator 7 can be set at desired values, respectively, by controlling the exciting current Im.

The driving unit 15 is constituted by a power transistor 19 having an emitter connected to the ground potential and a resistor R connected to the base of the power transistor 19. On the other hand, the exciting current detecting circuit 16 is composed of a shunt resistor Rs connected to the collector of the power transistor 19, and a differential amplifier circuit 17 which is connected across the shunt resistor Rs for detecting the exciting current Im.

The control arithmetic unit 14 includes a rotation number input port for fetching the signal indicating the rotation number Ne of the crank shaft derived from the crank angle signal outputted from a crank angle sensor (not shown), and an A/D (analogue-to-digital) converter input port for fetching the load voltage Vd by way of an isolation amplifier 18, another A/D converter input port for fetching the exciting current Im as detected via the differential amplifier circuit 17, and a PWM driving output port for outputting a driving signal to the power transistor 19 via the resistor R.

The control arithmetic unit 14 incorporates therein A/D converters (not shown), wherein corresponding A/D converter input ports constitute interface circuits for conditioning the input data so that the A/D converter of the control arithmetic unit 14 can read the data.

As can be seen in FIG. 2, the engine generator 7 is of the separately excitation type in which the exciting current Im flowing through the excitation coils 71 and 72 can be so controlled as to be constant by the control arithmetic unit 14.

The control arithmetic unit 14 is composed of a desired output power setting means for setting or determining desired output powers $P_0$ of the generator 7 for the load voltages Vd and storing in a memory as map data, a desired torque setting means for setting or determining desired torques $T_0$ (about 4.8 kg.m) demanded by the generator 7 for generating the desired output power $P_0$ on the basis of the load voltage Vd and the rotation number Ne of the crank shaft and storing as map data, an exciting current arithmetic means for calculating the exciting current Im of the engine generator 7 which makes the demanded torque Tg of the generator 7 coincide with the desired torque $T_0$, and an exciting current control means for driving the excitation coils 71 and 72 of the engine generator 7 so that the exciting current Im as calculated can flow through these coils. With the arrangement of the control arithmetic unit 14 described above, the demanded torque Tg of the engine generator 7 is controlled to be constant with the aid of the desired torque $T_0$ while the output power Pg of the engine generator 7 is controlled to be constant by using the desired output power $P_0$, whereby the engine 6 can be operated at a rotation number of the crank shaft at which the operation efficiency of the engine 6 is at maximum. This operation may be referred to as the point operation.

Figure 3:
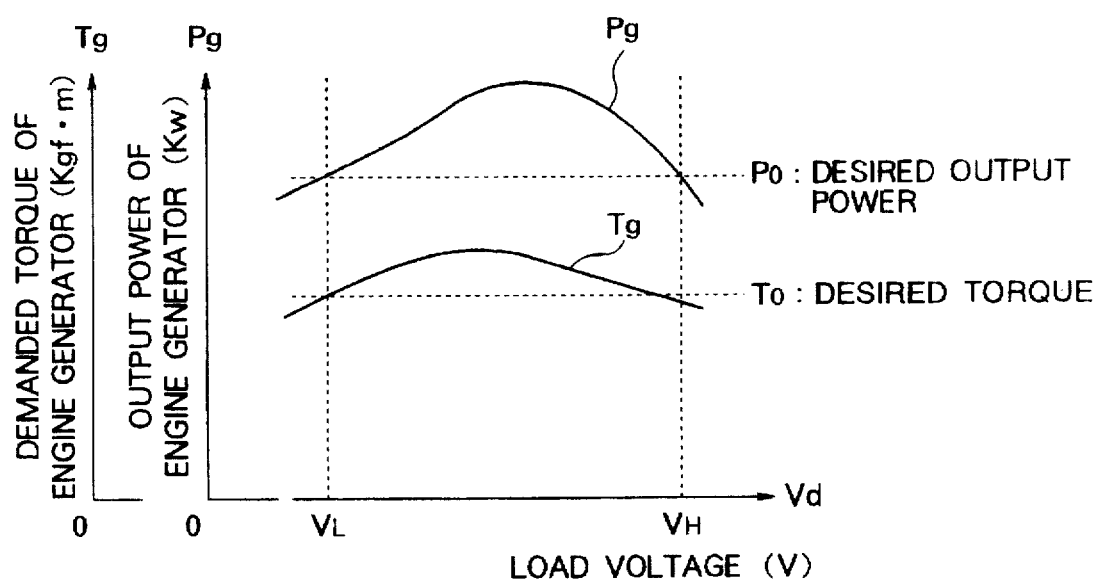
FIG. 3 is a characteristic diagram for illustrating graphically characteristic relations between a demanded torque and an output power of an engine generator and a load voltage in an engine generator control system according to the first embodiment of the invention.

FIG. 3 is a characteristic diagram for illustrating graphically characteristic relations between the load voltage Vd and the demanded torque Tg and the output power Pg of the engine generator 7. In the figure, solid-line curves represent changes of the demanded torque Tg and the output power Pg, respectively, before they are controlled to be constant, while broken-line curves represent values of the desired torque $T_0$ and the desired output power $P_0$ determined and stored in a memory in the form of map data, respectively.

As can be seen from FIG. 3, within the range of the load voltage Vd delimited by a lower limit value $V_L$ (about 280 volts) at which the output power Pg exceeds the desired output power $P_O$ (corresponding to the rated power) and an upper limit value $V_H$ (about 400 volts), the demanded torque Tg and the output power Pg are controlled to be constant at the values (represented by the broken lines) of the desired torque $T_O$ and the desired output power $P_O$, respectively. Parenthetically, the values of the desired torque $T_O$ and the desired output power $P_O$ are stored previously in a memory which is incorporated in the control arithmetic unit 14.

Figure 4:
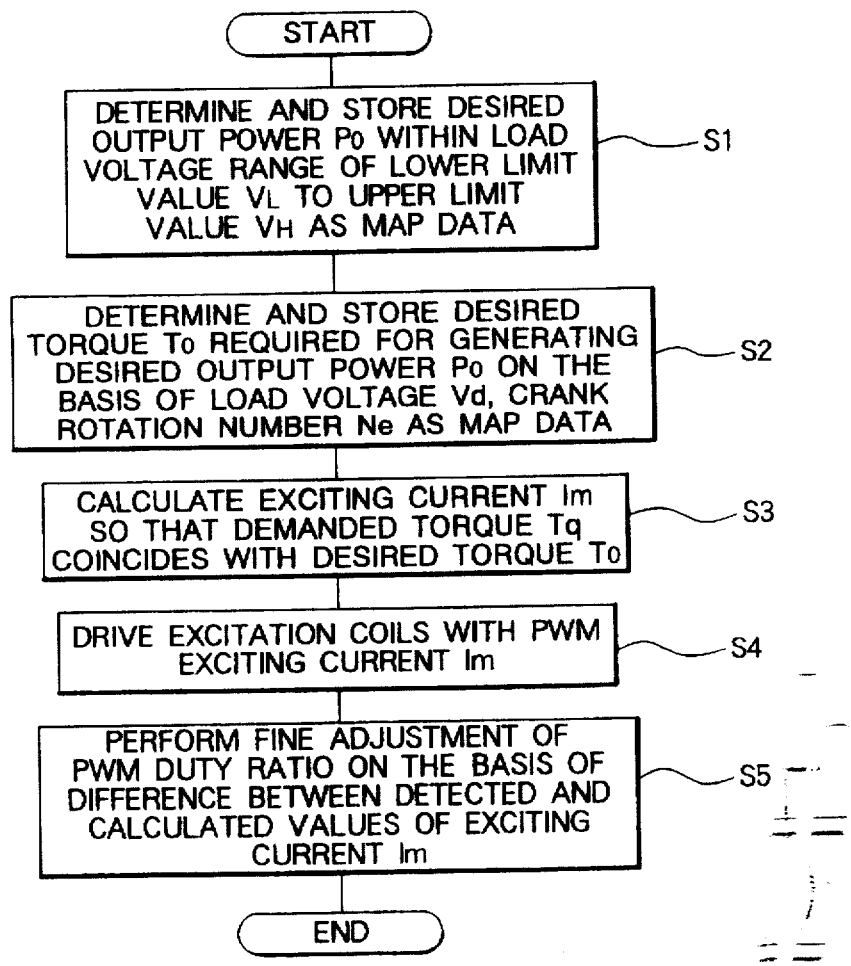
FIG. 4 is a flow chart for illustrating control operation of an exciting current according to the first embodiment of the invention.

Next, description will be directed to operation of the engine generator control system according to the instant embodiment of the present invention by referring to a flow chart of FIG. 4 together with FIG. 3.

In the first place, conventional operation performed before the constant torque control of the engine generator 7 will be considered. In general, assuming that the exciting current Im and the rotation number Ne of the crank shaft are constant, the demanded torque Tg and the output power Pg of the generator 7 change in such manner as illustrated by the solid-lines (FIG. 3) as a function of change of the load voltage Vd.

More specifically, the demanded torque Tg and the output power Pg of the engine generator 7 assume respective peak values at a median value of the load voltage Vd $(=(V_L+V_H)/2)$, while the demanded torque Tg and the output power Pg decrease, at both sides of the peaks, as indicated by the lower limit values $V_L$ and the upper limit values $V_H$, respectively.

Accordingly, when the output torque of the engine 6 to which the generator 7 is coupled changes, pulsation in the rotation of the crank shaft can not be suppressed timely with only the control of the rotation number Ne of the crank shaft by controlling the opening degree of the throttle valve 4 because of a delay (due to a dead time of the control system) in the control of the intake air quantity, as a result of which hunting will occur in the rotation number Ne of the crank shaft, providing a cause for degradation of the engine efficiency and the exhaust gas purification performance.

For the reasons mentioned above, in the engine generator control system according to the instant embodiment of the present invention, there is adopted such arrangement that the exciting current Im is controlled to be constant by the control arithmetic unit 14.

More specifically, the control arithmetic unit 14 determines the magnitude of the exciting current Im to be supplied to the excitation coils 71 and 72 of the generator 7 on the basis of the opening degree θ of the throttle valve 4, the rotation number Ne of the crank shaft and the load voltage Vd as detected.

Referring to FIG. 4, the range of the load voltage Vd (delimited by the lower limit value $V_L$ and the upper limit value $V_H$) which correspond to the rated voltage of the engine generator 7 is first established presumptively, whereupon the values of the desired output power $P_O$ are so determined that the output power Pg (and the demanded torque Tg) of the engine generator 7 is constant at the desired output power $P_O$ (and the desired torque $T_O$) within the presumed range of the load voltage Vd (step S1). The values as determined are stored in a memory as map data.

Subsequently, the control arithmetic unit 14 determines the desired torque $T_O$ required for the generator 7 to generate the output power Pg equal to the desired output power $P_O$ on the basis of the load voltage Vd and the rotation number Ne of the crank shaft (step S2).

Next, the value of the exciting current Im supplied to the excitation coils 71 and 72 of the generator 7 is arithmetically so determined that the demanded torque Tg of the generator 7 coincides with the desired torque $T_O$ regardless of variation in the load voltage Vd (step S3) within the range mentioned above.

In this way, the exciting current Im is arithmetically determined periodically at a predetermined interval on the basis of the load voltage Vd, the rotation number Ne of the crank shaft and the desired torque $T_O$ in the steps S1 to S3.

Now, the power transistors 19 of the driving unit 15 are turned on and off for realizing the PWM control so that the arithmetically determined exciting current Im can actually flow through the excitation coils 71 and 72 of the generator 7 (step S4).

In this conjunction, the relation between the output voltage Vg induced in the stator coil 73 of the generator 7 and the exciting current Im is given by the following expression (1).

$$Vg = Pm \cdot M \cdot \omega m \cdot Im \quad (1)$$

where Vg represents a high-frequency output voltage generated by the engine generator 7, Pm represents an armature constant indicative of number of output pole pairs of the generator 7, M represents an armature constant indicative of a mutual inductance, ωm represents an angular speed $(=2\pi Ne/60$ rad/sec), and Im represents the field current, i.e., the exciting current.

From the above expression (1), it can be seen that the exciting current Im of a value corresponding to the PWM duty ratio is in proportion to the output voltage Vg of the generator.

The exciting current Im is given by the following expression (2).

$$Im = VP/\{Rf(1+S \cdot \tau r)\} \quad (2)$$

where VP represents a PWM (pulse-width modulated) voltage, Rf represents equivalent resistances of the excitation coils 71 and 72, S represents a first order Laplace operator for taking a time lag into account and τr represents a time constant determined by the excitation coils 71 and 72.

As is apparent from the expressions (1) and (2), the exciting current Im can be made variable by making variable the PWM duty ratio, whereby the demanded torque Tg of the generator 7 as well as the output power Pg thereof can be controlled by controlling the PWM duty ratio.

To this end and in consideration of the temperature-ascribable drifts of the current flowing through the excitation coils 71 and 72, the control arithmetic unit 14 is so designed as to measure the actual exciting current Im with the aid of the exciting current detecting circuit 16.

On the basis of the difference between the calculated value of the exciting current Im and the detected value thereof, the PWM duty ratio of the driving signal for the power transistor 19 is adjusted or controlled more finely to thereby realize the control of the demanded torque Tg of the engine generator 7 so that the demanded torque Tg approaches more closely to the desired torque $T_O$ (step S5).

In this manner, the constant torque control of the generator 7 can be achieved notwithstanding of variation of the load, which in turn means that the load imposed on the engine remains constant.

Accordingly, even when the load voltage Vd changes steeply, the throttle valve 4 may be controlled very gently. Thus, the manipulatability of the throttle valve 4 can be enhanced. Besides, the engine 6 can be operated at a rotation number which assures a maximum efficiency due to the point operation control described above. Thus, the fuel-cost performance of the engine 6 can significantly be enhanced.

In this manner, by controlling the exciting current Im constantly on the basis of the rotation number of the engine generator 7 which corresponds to the rotation number Ne of the crank shaft of the engine 6, the load voltage Vd and the desired torque $T_0$, there can be accomplished a constant rotation control of the engine 6 as well. Thus, the operation efficiency of the engine 6 as well as that of the exhaust gas purification can easily be improved significantly.

Further, the control arithmetic unit 14 controls the engine control apparatus 10 such that the A/F (air/fuel ratio) assumes constantly a theoretical value of "14.7" for the purpose of realizing satisfactory purification of the exhaust gas.

In this conjunction, it is to be noted that the opening degree θ of the throttle valve 4 corresponding to the intake air quantity of the engine 6 undergoes any appreciable change. This means that it is unnecessary to correct the fuel injection quantity by taking into account the acceleration or deceleration. Thus, the exhaust gas purification can easily be effectuated.

Embodiment 2

In the foregoing description concerning the first embodiment of the present invention, consideration is paid to only the control of the exciting current Im within the rated voltage range of the engine generator 7. However, such situation may arise in which the demanded torque Tg of the generator 7 becomes lower than the desired torque $T_0$ due to transient fluctuation of the load, as a result of which the output power Pg of the engine generator 7 becomes lower than the rated power. In that case, steep increase of the engine rotation speed may take place, which can however be prevented by adopting the measures mentioned below.

Namely, within the rated power range of the engine generator 7, the control range for the ignition timing as defined by an angle of advance and an angle of lag is enlarged for the purpose of correcting by interpolation the control errors between the desired torque and the demanded torque to thereby effect an angle-of-lag correcting control for the ignition timing without moving the throttle valve 4 toward the closed state.

More specifically, in the case of the first embodiment of the present invention described previously, the exciting current Im of the engine generator 7 is controlled in dependence on the change of the load voltage Vd to thereby realize the constant torque control. Accordingly, so long as the output power Pg of the generator 7 falls within the rated power range of the engine generator 7, the output torque Te of the engine 6 remains substantially constant with the change of the throttle valve 4 thus being negligible.

However, when the load of the engine generator 7 becomes so small that the output power Pg of the generator 7 does not reach the rated power, the demanded torque Tg of the generator 7 becomes smaller than the desired torque $T_0$. Thus, the output torque Te of the engine 6 becomes small, whereby a steep increase of the rotation speed of the engine may be take place.

Consequently, in order to suppress such unwanted phenomenon, it is required to move the throttle valve 4 to the closed state, which, however, brings about deterioration of the exhaust gas purification performance.

Such being the circumstances, it is desirable that upon transient lowering of the output power of the engine generator, the ignition timing of the engine 6 is controlled with a corrected angle of lag to lower temporarily the output torque Te of the engine 6 to thereby suppress the rotation number from increasing steeply and ensure the constant control of the rotation number Ne of the crank shaft of the engine 6 at a desired rotation number $N_0$.

With the invention incarnated in the second embodiment thereof, it is contemplated to perform the ignition timing lag correction upon occurrence of transient load variation or fluctuation. To this end, the control arithmetic unit 14 according to the second embodiment of the invention includes a load change decision means for making decision whether the output power Pg of the generator 7 is higher than the rated power by determining whether the load voltage Vd lies within a predetermined range ($V_L$ to $V_H$) and an ignition timing correcting means for correcting the ignition timing of the engine 6 with an angle of lag so that the rotation number Ne of the crank shaft coincides with the desired rotation number $N_0$ in case the decision is made to the effect that the output power Pg of the generator 7 is short of the rated power.

Figure 5:
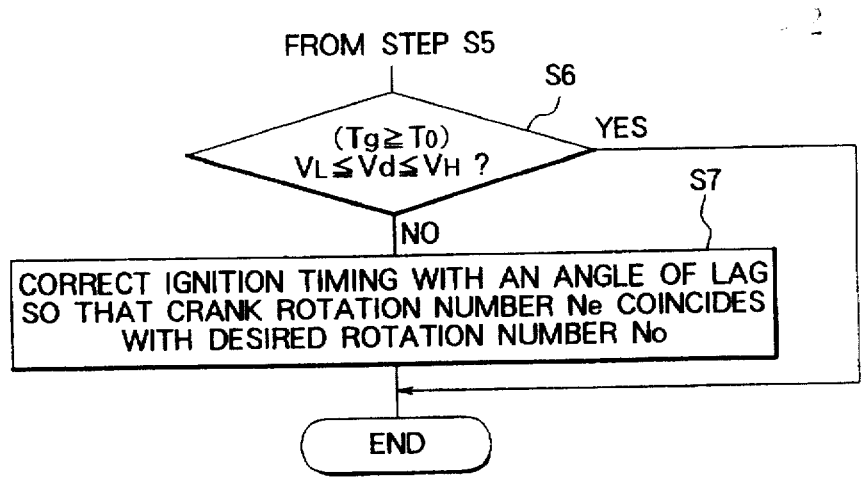
FIG. 5 is a flow chart for illustrating correcting operation of ignition timing according to a second embodiment of the invention.

FIG. 5 is a flow chart for illustrating a procedure for correcting the ignition timing of the engine with a corrected angle of lag according to the second embodiment of the present invention.

Referring to FIG. 5, in succession to the step S5 (see FIG. 4), the control arithmetic unit 14 makes decision whether the output power Pg of the generator 7 is lower than the rated power (i.e., whether the demanded torque Tg is lower than the desired torque $T_0$) by deciding whether the load voltage Vd is within the predetermined range ($V_L$ to $V_H$) in a step S6.

When it is decided that the load voltage Vd falls within the predetermined range (i.e., in case the decision step S6 results in affirmation "YES"), the routine is then terminated without executing any further processing.

On the contrary, when it is decided that the load voltage Vd does not fall within the predetermined range and that the output power Pg of the generator 7 does not reach the rated power (i.e., when Tg<$T_0$), the ignition timing of the engine 6 is corrected with an angle of lag determined such that the rotation number Ne of the crank shaft coincides with the desired rotation number $N_0$ (step S7).

In this way, when the generated power of the engine generator 7 is short of the rated power, the ignition timing of the engine 6 is corrected with an appropriate angle of lag without operating the throttle valve 4. In that case, although the operation efficiency of the engine 6 lowers temporarily, the exhaust gas purification performance can easily be enhanced because no change takes place in the opening degree θ of the throttle valve 4.

It will now be understood that the rotation number Ne of the crank shaft can be maintained at a value at which the optimal efficiency is ensured for the generator 7 independent of power fluctuation due to the transient variation of the load voltage Vd, whereby the operation of the engine 6 is maintained at a point at which at a highest efficiency can be ensured without need for manipulating the throttle valve 4 while ensuring a constant output power Pg.

Furthermore, in case the opening degree of the throttle valve changes gently, the rotation number of the engine 6 can be stabilized at the optimal rotation number of the crank shaft while suppressing the pulsation of rotation speed, whereby the rotation number Ne of the crank shaft can be maintained stable notwithstanding of transient fluctuation of the load.

Embodiment 3

In the case of the second embodiment of the invention described above, the ignition timing of the engine 6 is corrected with an angle of lag, when the rated power is not fulfilled. In this conjunction it should be mentioned that the substantially same effect can be achieved by moving the throttle valve 4 toward the closed state at a relatively low constant speed. The third embodiment of the invention is directed to such control of the throttle valve 4.

Figure 6:
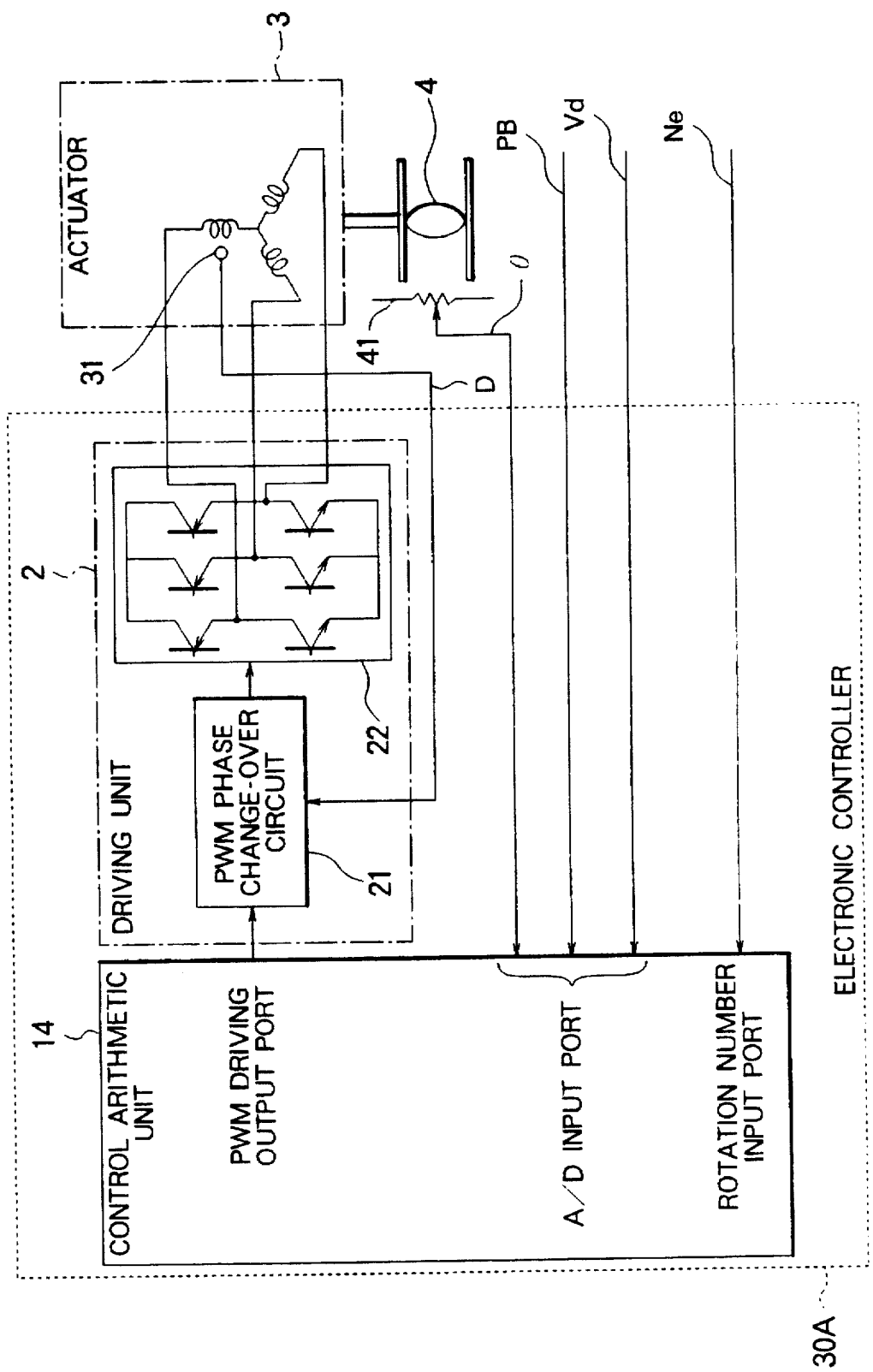
FIG. 6 is a circuit block diagram showing an arrangement of the electronic controller, the actuator and the throttle valve according to a third embodiment of the present invention.

FIG. 6 is a circuit block diagram showing an arrangement of the electronic controller 30A, the actuator 3 and the throttle valve 4 according to the third embodiment of the present invention which is directed to the control of the opening degree θ of the throttle valve 4.

Referring to FIG. 6, there are provided a variety of sensors such as a driving position sensor 31 for detecting a driving position D of the actuator 3, a throttle position sensor 41 for detecting the opening degree θ of the throttle valve 4 driven by the actuator 3 and a pressure sensor (not shown) for detecting a boosted pressure or intake manifold pressure.

The driving position sensor 31 may be constituted by a Hall element while the throttle position sensor 41 may be constituted by a variable resistor.

The driving unit 2 incorporated in the electronic controller 30A for controlling the actuator 3 is comprised of a PWM phase change-over circuit 21 driven under the control of a PWM control signal supplied from the control arithmetic unit 14 through a PWM driving output port and a three-phase full-rectification bridge circuit 22 realized in the form of a transistor bridge circuit for generating an output signal on the basis of the output signal of the PWM phase change-over circuit 21.

The actuator 3 includes a three-phase coil assembly for positioning angularly the throttle valve 4 in response to the driving signal.

The electronic controller 30A fetches therein the information concerning the driving position D of the actuator 3, the opening degree θ of the throttle valve 4, the load voltage Vd, the boosted pressure PB of the engine 6 and the rotation number Ne of the crank shaft.

The opening degree θ of the throttle valve 4, the load voltage Vd and the boosted pressure PB are inputted to the control arithmetic unit 14 through the A/D input port, while the information of the rotation number Ne of the crank shaft is inputted to the control arithmetic unit 14 via the rotation number input port. On the other hand, the information of the driving position D of the actuator 3 is inputted to the PWM phase change-over circuit 21 incorporated in the driving unit 2.

The control arithmetic unit 14 is comprised of a load change decision means for making decision as to whether the output power Pg of the engine generator 7 exceeds the rated power by determining whether the load voltage Vd lies within the predetermined range, and an opening degree correcting means for controlling the opening degree θ of the throttle valve 4 toward the closed state at a constant rate until the rotation number Ne of the crank shaft coincides with the desired rotation number $N_0$ when it is decided that the load voltage Vd is outside of the predetermined range and that the output power of the generator 7 is short of the rated power.

By controlling the opening degree θ of the throttle valve 4 toward the closed state at a constant rate or speed so that the rotation number Ne of the crank shaft coincides with the desired rotation number $N_0$ when the output power Pg of the generator 7 does not reach the rated power, the constant rotation control of the engine 6 can be achieved by suppressing the pulsation of the rotation speed (rpm) even in the case where the output power Pg is short of the rated power due to fluctuation of the load voltage Vd.

As is apparent from the above description, the constant rotation control of the engine 6 with suppression of the pulsation, high operation efficiency, low-noise implementation and excellent exhaust gas purification performance can be realized by controlling the throttle valve 4 toward the closed state in precedence to lowering of the demanded torque Tg of the generator 7 due to the lowering of the load.

At this juncture, it should also be mentioned that the rotation number Ne of the crank shaft is subjected to the feedback control of the control arithmetic unit 14 so that the engine 6 can be operated at the rotation number of the crank shaft which ensures a maximum efficiency realization of the optimal point operation of the engine.

In that case, the control arithmetic unit 14 constantly controls the opening degree θ of the throttle valve 4 as detected with the desired opening degree $θ_0$ of the throttle valve 4 determined arithmetically by the control arithmetic unit 14 while effecting a D-PI (differentiation-proportional integration) control, wherein the difference between the opening degree θ as detected and the desired opening degree $θ_0$ as calculated is supplied to the PWM phase change-over circuit 21 as the PWM duty ratio information.

As a result, the throttle valve 4 is driven via the actuator 3, whereby the rotation number Ne of the crank shaft of the engine 6 can be controlled to increase or decrease in dependence on the change of the PWM duty ratio.

In that case, the opening degree θ of the throttle valve 4 is driven at a relatively low speed without fluctuation, incurring thus no degradation of the exhaust gas.

Figure 7:
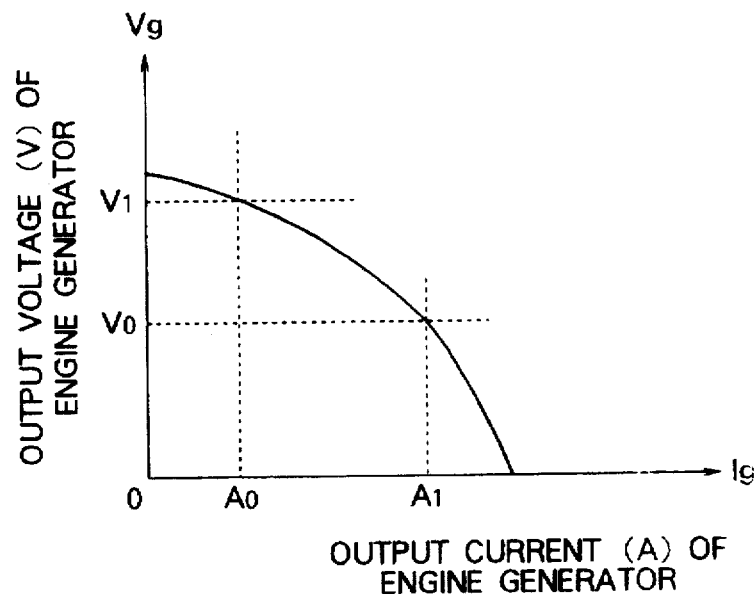
FIG. 7 is a characteristic diagram showing graphically a relation between an output voltage and an output current of an engine generator for illustrating operation of the control system according to the third embodiment of the invention.

FIG. 7 is a characteristic diagram for graphically illustrating a relation between an output voltage Vg and an output current Ig of a conventional three-phase synchronous generator 7, wherein an output voltage range V0–V1 and an output current range A0–A1 represent the range in which the rated output voltage of the generator 7 can be obtained even when the load changes.

Figure 8:
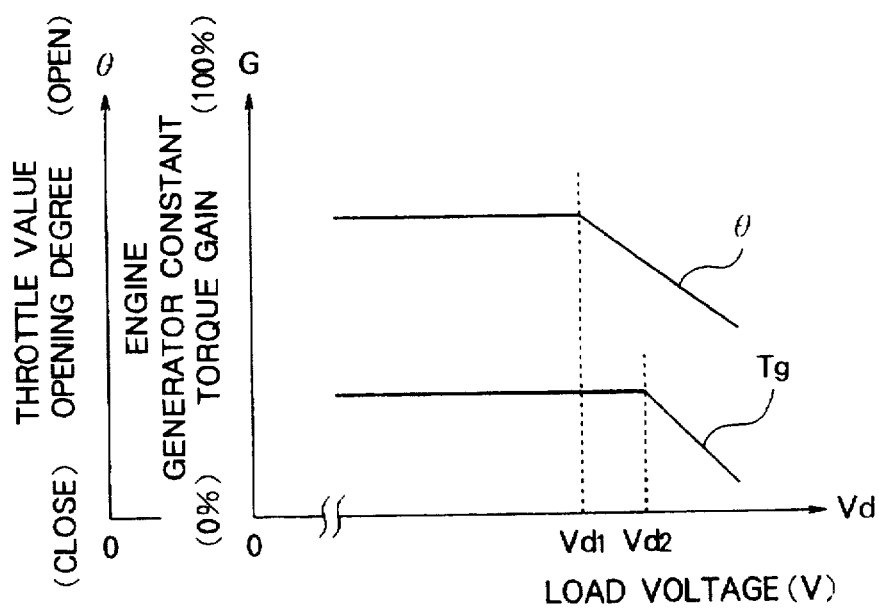
FIG. 8 is a characteristic diagram showing graphically relations between a demanded torque of the engine generator and a load voltage and the opening degree of a throttle valve for illustrating operation of the control system according to the third embodiment of the invention.

FIG. 8 is a characteristic diagram for illustrating relations between the load voltage Vd of the generator 7 and the opening degree θ of the throttle valve 4 controlled according to the invention incarnated in the third embodiment and the demanded torque Tg of the generator 7. As can be seen from the figure, the opening degree θ of the throttle valve 4 is controlled toward the closed state when the load voltage Vd exceeds the reference voltage $Vd_1$, while the demanded torque Tg of the generator 7 is decreased when the load voltage Vd exceeds a second reference voltage $Vd_2$.

Figure 9:
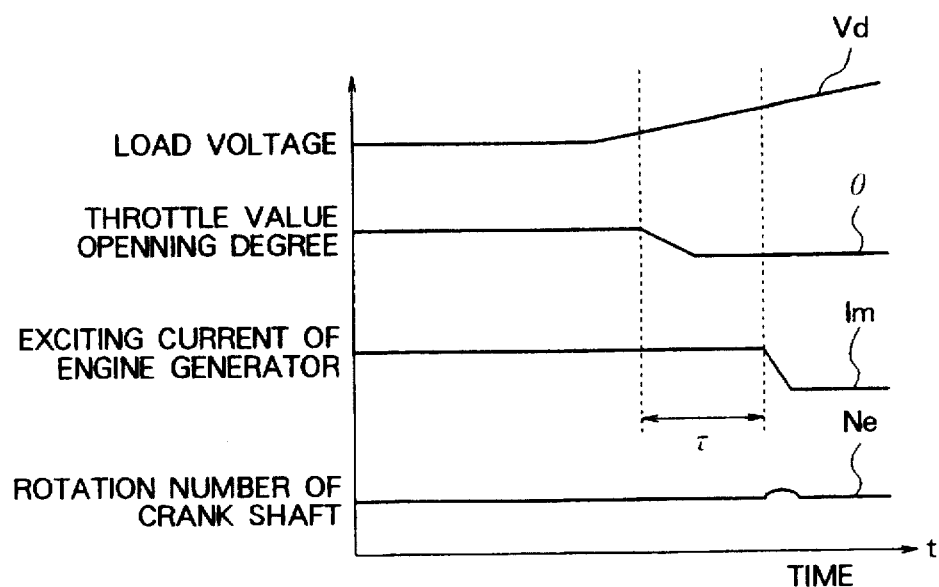
FIG. 9 is a characteristic diagram showing graphically changes of the load voltage, opening degree of the throttle valve, the exciting current and the rotation number of the crank shaft, respectively, as a function of time lapse for illustrating operation of the control system according to the third embodiment of the invention.

FIG. 9 is a characteristic diagram for illustrating changes of the load voltage Vd, the opening degree θ of the throttle valve 4, the exciting current Im and the rotation number Ne of the crank shaft, respectively, as a function of time lapse t in a time-serial sequence. In this figure, the time lag τ of the intake air quantity corresponds to a distance intervening between a time point at which the closing of the throttle valve is started and a time point at which the exciting current Im starts to decrease.

Figure 10:
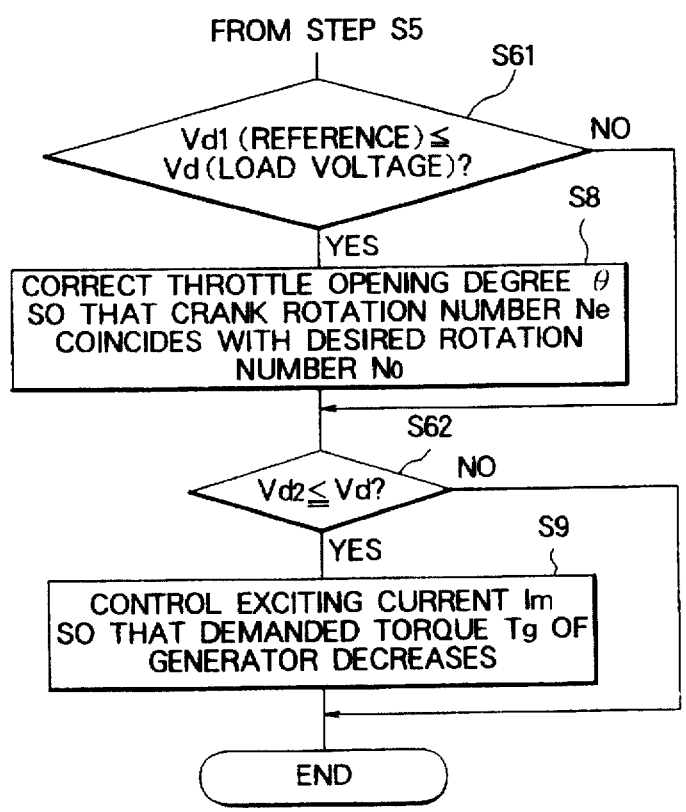
FIG. 10 is a flow chart for illustrating a throttle valve control operation performed by the control system according to the third embodiment of the invention.

FIG. 10 is a flow chart for illustrating operation of the control system according to the third embodiment of the present invention. The control procedure shown in FIG. 10 differs from that of FIG. 4 in that a step S8 for correcting the opening degree θ and a step S9 for correcting the demanded torque Tg are inserted in succession to the step S5 shown in FIG. 4.

Now, referring to FIGS. 7 to 10, the preceding control operation for the throttle valve 4 according to the invention incarnated in the third embodiment will be described in detail.

The following description will be directed to the suppression of the rapid or steep increase of the rotation speed Ne of the crank shaft of the engine 6 and the pulsation by controlling the throttle valve 4 toward the closed position when the output power Pg of the generator 7 is short of the rated power.

In general, the output voltage Vg and the output current Ig of the generator 7 bear such a characteristic relation as illustrated in FIG. 7. When the output voltage Vg and the output current Ig change, the ranges V0–V1 and A0–A1 where the rated power can be obtained is limited although it depends on the specifications and other factors of the engine generator 7.

Since it is assumed that the generator 7 is of a separate excitation type and that the constant torque control is performed, the control of the throttle valve 4 is required only when the load of the generator 7 lowers to a level lower than the rated power level. In that case, as the output current Ig, (i.e., the load current) decreases, the output voltage Vg tends to increase, as can be seen from FIG. 7.

Under the circumstances, the reference voltages $Vd_1$ and $Vd_2$ are previously stored in a map memory incorporated in the control arithmetic unit 14, wherein the opening degree θ of the throttle valve 4 is decreased when the load voltage Vd attains at or increases beyond the reference voltage $Vd_1$, while the demanded torque Tg of the generator 7 is lowered when the load voltage Vd attains at or increases beyond the reference voltage $Vd_2$.

In this conjunction, the reference voltage $Vd_1$ providing a reference for decreasing the opening degree θ of the throttle valve 4 is set at a smaller value of the reference voltage $Vd_2$ providing a reference for lowering the demanded torque Tg of the generator 7 so that the opening degree θ of the throttle valve 4 is decreased in precedence to the lowering control of the demanded torque Tg of the generator 7.

More specifically, referring to FIG. 10, the load voltage Vd is first compared with the reference voltage $Vd_1$ to decide whether the load voltage Vd attains or exceeds the reference voltage $Vd_1$.

When it is decided in this step that the load voltage Vd is lower than the reference voltage $Vd_1$ (i.e., when this decision step results in negation "NO"), the processing proceeds to a next decision step S62. On the other hand, when it is decided in the step S61 that $Vd_1 \leq Vd$, the opening degree θ of the throttle valve 4 is corrected toward the closed position so that the rotation number Ne of the crank shaft of the engine 6 coincides with the desired rotation number $N_0$ (step S8).

Subsequently, it is decided whether the load voltage Vd reaches or exceeds the reference voltage $Vd_2$ (step S62). When decision is made that $Vd < Vd_2$, the routine shown in FIG. 10 is terminated. On the other hand, when it is decided that $Vd_2 \leq Vd$, the exciting current Im is corrected so that the demanded torque Tg of the generator 7 decreases.

As is apparent from FIG. 9 which illustrates the above-mentioned operations as a function of time lapse, the opening degree θ of the throttle valve 4 is moved in the closing direction before the exciting current Im equivalent to the demanded torque Tg of the generator 7 is decreased. Consequently, time lag in the air intake operation as well as the quiescent time (dead time) of the control system can be canceled out. In this manner, steep increase of the rotation speed of the engine under light load can successfully be suppressed.

Representing the time of lag involved in the combustion in the engine 6 by a dead time tL while assuming that the time of lag in the air intake is fixed and assuming that the dead time tL covers the intake stroke, the compression stroke and the combustion stroke, the dead time tL is then considered as being equal to 1.5 rotation of the engine 6. The dead time is in reverse proportion to the rotation number Ne of the crank shaft and can be given by the following expression:

$$tL = (60 \times 1.5)/Ne \quad (3)$$

In practical control, the dead time tL may be considered approximately as a time lag of first order in consideration of the change of the rotation number Ne of the crank shaft as a function of time. Thus, by using a Laplacian operator S, the following expression (4) applies:

$$\exp(-tL \cdot S) \approx 1 - tL \cdot S \quad (4)$$
$$\approx 1/(1 + tL \cdot S)$$

Thus, by controlling the opening degree θ of the throttle valve 4 in precedence to the demanded torque Tg (i.e., the exciting current Im) of the generator 7, rapid increasing or fluctuation of the engine speed as well as pulsation of the rotation can satisfactorily be suppressed. Thus, low-noise operation of the engine and purification of the exhaust gas can easily be realized.

Embodiment 4

In the case of the third embodiment of the invention described above, the opening degree θ of the throttle valve 4 is changed in precedence to changing of the demanded torque Tg (the exciting current Im) of the engine generator 7 for thereby canceling out the lag in the air intake system of the engine 6. However, when the position of the desired opening degree $θ_0$ to be attained in the preceding control is ambiguous, there may arise such unwanted situation that the rotation number Ne of the crank shaft of the engine 6 decreases.

Accordingly, it is desirable that the preset value (map values) of the demanded torque Tg are so arithmetically determined that the difference (torque margin) between the output torque Te of the engine 6 and the demanded torque Tg of the engine generator 7 always assumes a constant value. More specifically, the output torque Te corresponding to the desired torque $T_0$ of the generator 7 is estimated by the microcomputer incorporated in the control arithmetic unit 14, whereupon the throttle valve 4 is fixed to the opening degree θ which is determined on the basis of the estimated engine output torque Te.

The fourth embodiment of the present invention is directed to the estimation of the engine output torque Te and interpolating arithmetic determination of the desired torque $T_0$ by using the map or stored data. Parenthetically, the electronic controller 30A employed in the fourth embodiment of the invention is same as that shown in FIG. 6.

The control arithmetic unit 14 according to the instant embodiment of the invention includes an output torque estimating means for estimating the output torque Te of the engine 6 on the basis of the opening degree θ and the boosted pressure PB as detected and a desired opening degree arithmetic means for determining the desired opening degree $θ_0$ of the throttle valve 4 by interpolating the values stored in the map memory on the basis of the relation between the demanded torque Tg of the generator 7 and the output torque Te of the engine 6.

The opening degree correcting means is so arranged as to control the opening degree θ of the throttle valve 4 to the desired opening degree $θ_0$ so that the rotation number Ne of the crank shaft coincides with the desired rotation number $N_0$ in the case where the output power Pg of the generator 7 fails to reach the rated power.

Thus, the throttle valve 4 is controlled toward the closed state before the demanded torque Tg of the generator 7 becomes low due to decreasing of the load, whereby pulsation of rotation of the engine 6 is suppressed so that the rotation of the latter is maintained to be constant. Thus, high operation efficiency of the engine, low-noise implementation and excellent exhaust gas purification can be achieved.

In this manner, the opening degree θ is controlled to be optimal in precedence even when the desired torque $T_0$ of the generator 7 (corresponding to the output power Pg of the generator 7) changes, whereby the fluctuation of rotation of the engine 6 such as steep increase of the rotation speed thereof as well as pulsation can be suppressed.

Now, referring to FIGS. 11 to 13, description will be made in detail of the processing for estimating the output torque Te of the engine 6 and the processing for determining the desired opening degree $\theta_0$ by interpolation.

Figure 11:
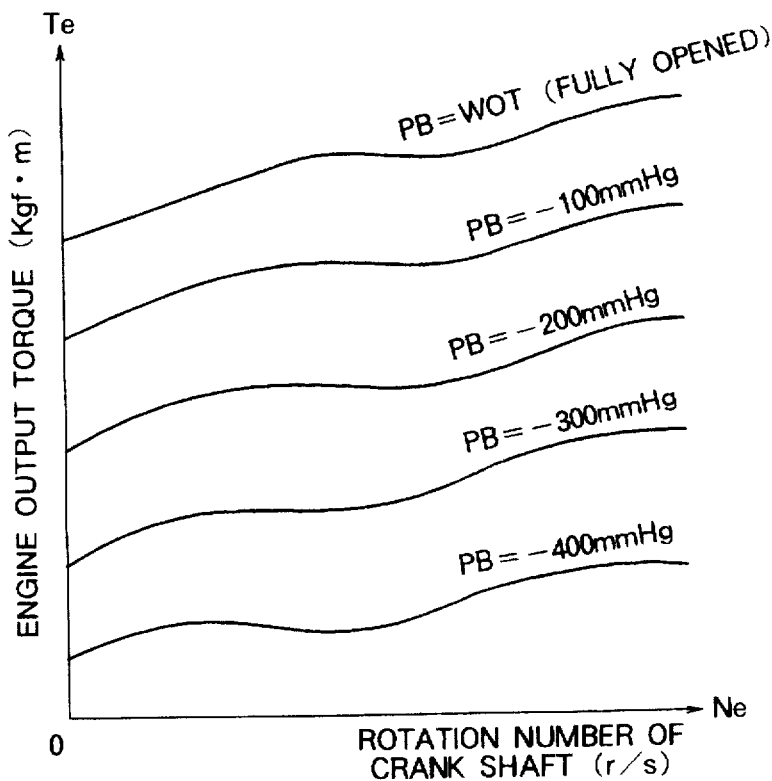
FIG. 11 is a characteristic diagram showing graphically relations between a rotation speed of a crank shaft of an engine and an output torque of the engine with boosted pressures being used as parameters for illustrating operation of a control system according to a fourth embodiment of the invention.

FIG. 11 is a characteristic diagram for graphically illustrating relations between the rotation number Ne of the crank shaft of the engine 6 and the output torque Te with the boosted pressures PB being used as parameters, wherein the boosted pressure is assumed to change from the atmospheric pressure WOT (indicating fully opened state of the throttle valve) to the fully closed state stepwise from −100 mmHg to −200 mmHg, to −300 mmHg and then to −400 mmHg. These data are stored in the memory as map data.

Figure 12:
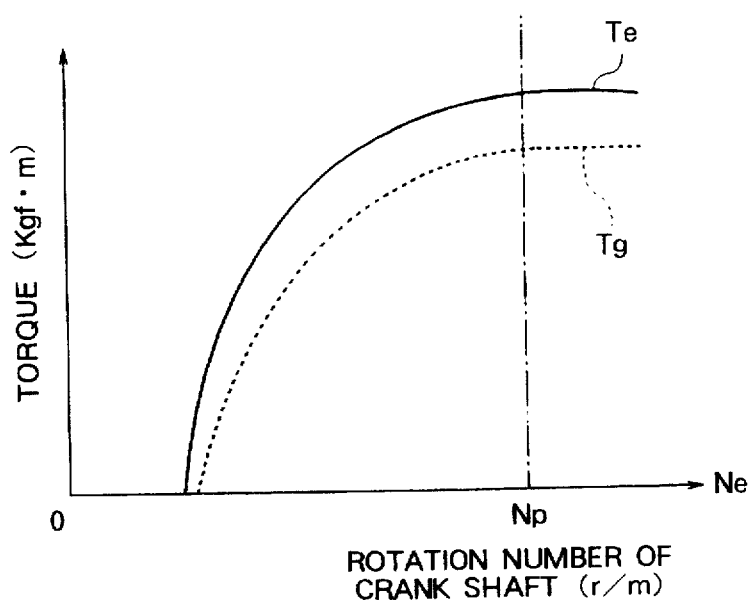
FIG. 12 is a characteristic diagram showing graphically relations between the rotation speed of a crank shaft and the output torque of the engine and the demanded torque of the engine generator for illustrating operation of the control system according to the fourth embodiment of the invention.

FIG. 12 is a characteristic diagram for graphically illustrating relations between the rotation number Ne of the crank shaft and the output torque Te of the engine 6 and the demanded torque Tg of the generator 7, wherein the difference between the output torque Te of the engine 6 and the demanded torque Tg of the generator 7 (i.e., torque margin) is so determined by using map data as to be constant not only at the rotation number Np ensuring the maximum efficiency but also for all the rotation numbers Ne of the crank shaft.

Figure 13:
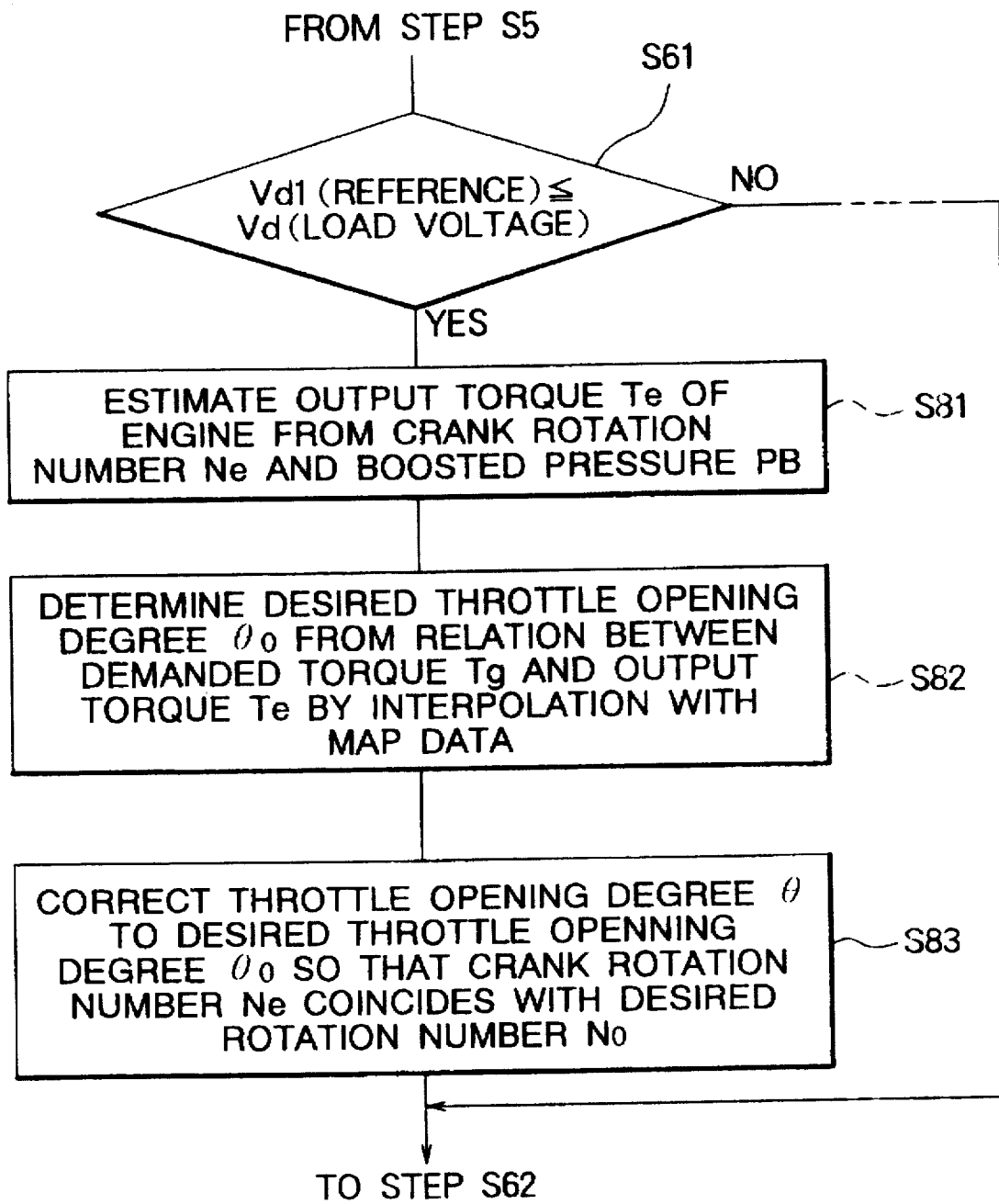
FIG. 13 is a flow chart for illustrating operation for estimating an engine output torque and operation for determining a desired throttle opening degree by interpolation in the control system according to the fourth embodiment of the invention.
Figure 14:
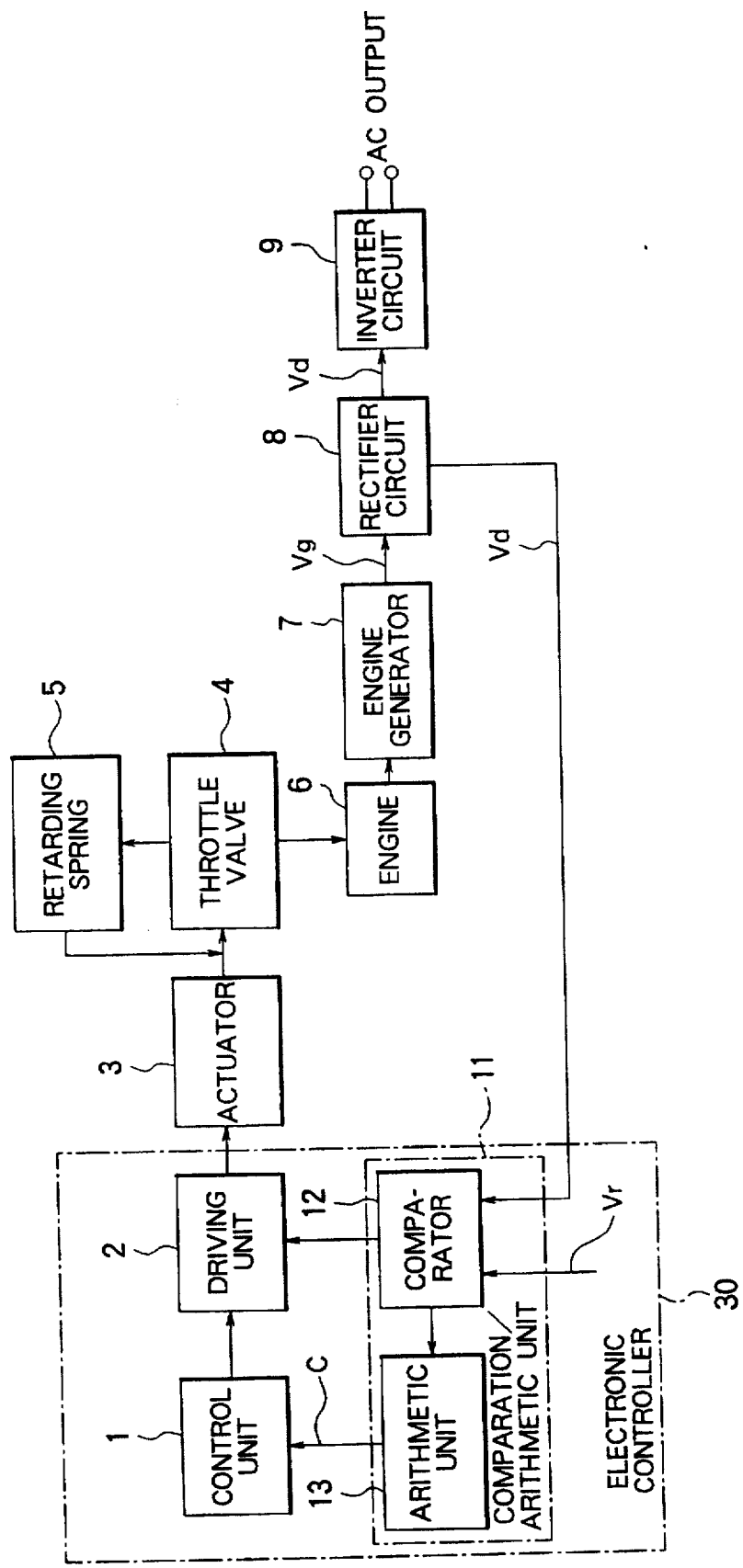
FIG. 14 is a block diagram showing schematically a general arrangement of a conventional control system for an engine generator.
Figure 15:
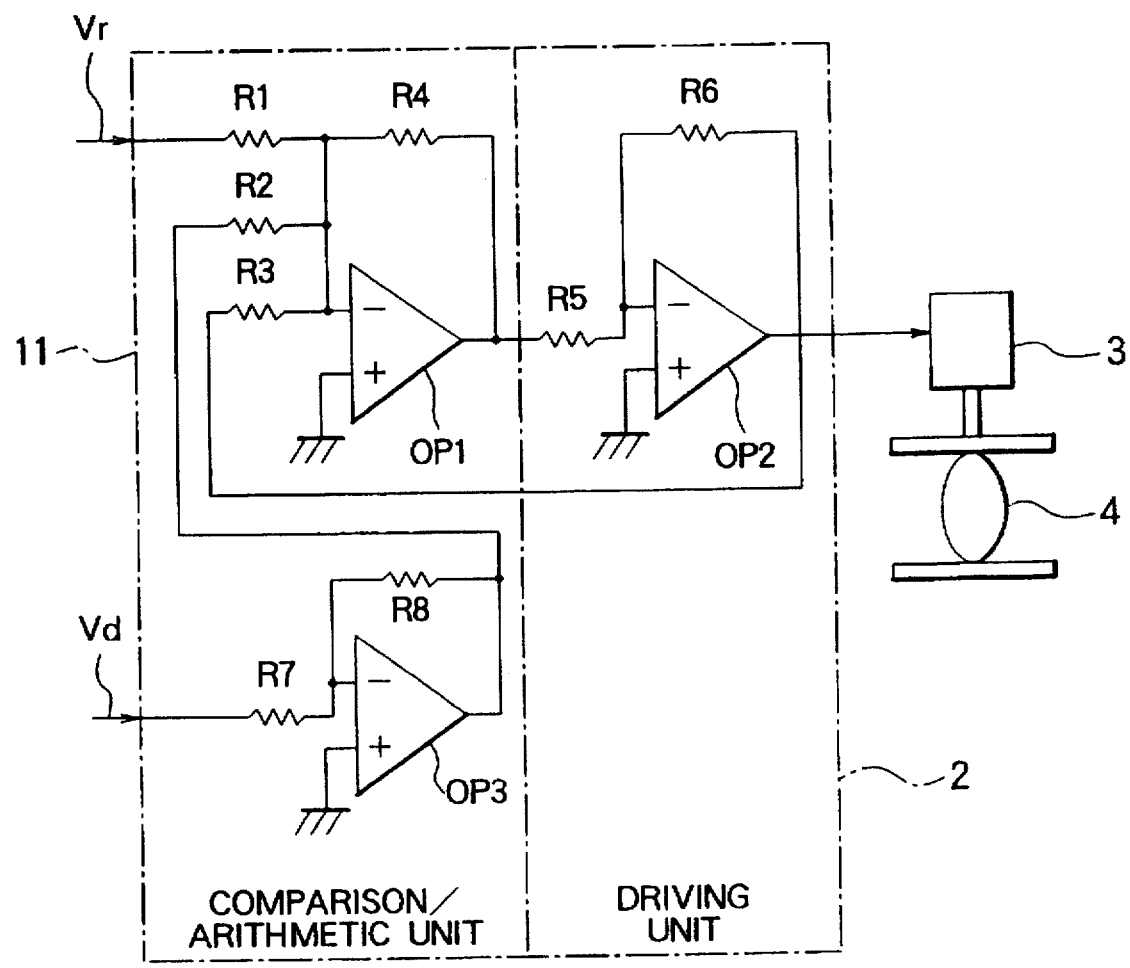
FIG. 15 is a circuit block diagram showing exemplary configurations of an electronic controller and a throttle valve shown in FIG. 14.

FIG. 13 is a flow chart for illustrating operation of the system according to the fourth embodiment of the invention which differs from that shown in FIG. 10 in that an output torque estimating step S81, a desired opening degree ($\theta_0$) interpolating arithmetic step S82 and an opening degree correcting step S83 are additionally provided in place of the opening degree correcting step S8 shown in FIG. 10.

The control arithmetic unit 14 incorporated in the electronic controller 30A stores previously in an associated memory the map data of the rotation number Ne of the crank shaft and the output torque Te of the engine 6 for each of the boosted pressures PB.

Referring to FIG. 13, when it is decided by the microcomputer of the control arithmetic unit 14 in a step S61 that $Vd_1 \leq Vd$ (i.e., the output power Pg of the generator 7 does not attain the rated power), the output torque Te of the engine 6 is estimated on the basis of the rotation number Ne of the crank shaft and the boosted pressure PB by referencing the map or memory data illustrated in FIG. 11 in a step S81.

Since the throttle bore diameter, the cylinder volume and the exhaust gas volume are all of fixed values, respectively, the output torque Te of the engine as estimated is statically an invariable value specific to the engine 6.

Subsequently, the desired opening degree $\theta_0$ is determined on the basis of the estimated output torque Te of the engine, whereon the desired opening degree $\theta_0$ is interpolated by taking into consideration the relation between the output torque Te of the engine 6 and the desired torque $T_0$ of the generator 7 by referencing the map or memory data (step S82).

In other words, by learning the desired opening degree $\theta_0$ on the basis of the difference appearing in the rotation number Ne of the crank shaft after change of the demanded torque Tg of the generator 7 every time the demanded torque Tg changes, the map data is renewed or updated.

Subsequently, the opening degree $\theta$ of the throttle valve 4 is corrected to the desired opening degree $\theta_0$ so that the rotation number Ne of the crank shaft coincides with the desired rotation number $N_0$.

In this way, a constant rotation control of the engine 6 can be realized with high accuracy.

Many modifications and variations of the present invention are possible in the light of the above techniques. It is therefore to be understood that within the scope of the appended claims, the invention may be practiced otherwise than as specifically described.

What is claimed is:

1. A control system for an engine generator, comprising:

a throttle valve for regulating a quantity of intake air supplied to an internal combustion engine;

engine control means for controlling a quantity of fuel to be injected to said engine and an ignition timing therefor;

an actuator for adjusting an opening degree of said throttle valve;

a rectifier circuit for rectifying an output voltage of said engine generator to thereby produce a DC load voltage;

a load supplied with an output power of said engine generator under application of said load voltage; and an electronic controller for controlling an exciting current of said engine generator, said engine control means and said actuator on the basis of various information indicative of operation states of said engine;

said various information containing at least information concerning a load voltage which depends on resistance of said load and information concerning a rotation number of said engine;

said electronic controller including:

desired output power setting means for determining a desired output power of said engine generator for a given load voltage and storing said desired output power;

desired torque setting means for determining a desired torque demanded by said engine generator required for generating said desired output power on the basis of said load voltage and said crank shaft rotation number and storing said desired torque;

exciting current arithmetic means for arithmetically determining an exciting current of said engine generator so that a demanded torque of said generator coincides with said desired torque; and exciting current control means for driving an excitation coil assembly of said engine generator with said excitation current;

wherein said demanded torque of said engine generator is controlled to be constant at said desired torque to thereby control said output power of said generator to be constant at said desired output power while allowing said engine to operate at a rotation number of the crank shaft at which a maximum output efficiency of said engine can be ensured.

2. A control system for an engine generator according to claim 1, wherein said electronic controller includes:

exciting current detecting means for detecting an exciting current to be supplied to said engine generator; and exciting current correcting means for correctively adjusting finely said exciting current on the basis of a difference between the detected value of said exciting current and the arithmetically determined value thereof.

3. A control system for an engine generator according to claim 1, wherein said electronic controller includes:

load change decision means for making decision whether the output power of said engine generator is higher than a rated power inclusive thereof by deciding whether said load voltage lies within a predetermined range; and ignition timing correcting means for correctively controlling the ignition timing of said engine so that said rotation speed of the crank shaft coincides with a desired rotation speed when it is decided that said load voltage is outside of said predetermined range and that the output power of said generator fails to reach the rated power.

4. A control system for an engine generator according to claim 1, wherein said electronic controller includes:

load change decision means for making decision whether the output power of said engine generator is higher than a rated power inclusive thereof by deciding whether said load voltage lies within a predetermined range; and throttle opening degree correcting means for correctively controlling an opening degree of said throttle valve in a direction in which said opening degree of said throttle valve is decreased so that said rotation speed of the crank shaft coincides with a desired rotation speed, when it is decided that said load voltage is outside of said predetermined range and that the output power of said engine generator fails to reach the rated power.

5. A control apparatus for generator of engine according to claim 4, said various information containing information concerning an opening degree of said throttle valve information concerning and a boosted pressure of said engine;

said electronic controller including:

output torque estimating means for estimating an output torque of said engine on the basis of said information concerning the opening degree of said throttle valve and said boosted pressure; and desired opening degree determining arithmetic means for determining the desired opening degree of said throttle valve through interpolation based on a relation between the demanded torque of said engine generator and the output torque of said engine;

wherein said opening degree correcting means controls the opening degree of said throttle valve toward said desired opening degree so that said rotation speed of the crank shaft coincides with said desired rotation speed, when the output power of said engine generator fails to reach said rated power.

6. A control system for an engine generator, comprising:

a throttle valve for regulating a quantity of intake air supplied to an internal combustion engine;

an actuator for adjusting an opening degree of said throttle valve;

an electronic controller for controlling an exciting current of said engine generator and said actuator on the basis of various information indicative of operation states of said engine, said various information including information concerning a load voltage of an electrical load of said generator and information concerning a rotation speed of said engine;

said electronic controller comprising:

desired output power setting means for determining a value of desired output power of said engine generator for a given load voltage and storing said value of desired output power;

desired torque setting means for determining a desired torque demanded by said engine generator required for generating said desired output power on the basis of said load voltage and said rotation speed of said engine and storing said desired torque;

exciting current arithmetic means for arithmetically determining an exciting current of said engine generator so that a demanded torque of said generator coincides with said desired torque; and exciting current control means for driving an excitation coil assembly of said engine generator with said excitation current;

wherein said demanded torque of said engine generator is controlled to be constant at said desired torque to thereby control said output power of said generator to be constant at said desired output power while allowing said engine to operate at a rotation speed at which a maximum output efficiency of said engine can be ensured.

7. A control system for an engine generator as set forth in claim 6, wherein said electronic controller further comprises:

exciting current detecting means for detecting an exciting current to be supplied to said engine generator; and exciting current correcting means for correctively adjusting said exciting current on the basis of a difference between the detected value of said exciting current and the arithmetically determined value thereof.

8. A control system for an engine generator as set forth in claim 6, wherein said electronic controller further comprises:

load change decision means for judging whether the output power of said engine generator is higher than a rated power by judging whether said load voltage lies within a predetermined range; and ignition timing correcting means for correctively controlling an ignition timing of said engine so that said rotation speed of said engine coincides with a desired engine rotation speed when it is decided that said load voltage is outside of said predetermined range and that the power output of said generator fails to reach the rated power.

9. A control system for an engine generator as set forth in claim 6, wherein said electronic controller further comprises:

load change decision means for judging whether the output power of said engine generator is higher than a rated power by judging whether said load voltage lies within a predetermined range; and throttle opening degree correcting means for correctively controlling an opening degree of said throttle valve in a direction in which said opening degree of said throttle valve is decreased so that said engine rotation speed coincides with a desired rotation speed, when it is judged that said load voltage is outside of said predetermined range and that the output power of said engine generator fails to reach the rated power.

10. A control system for an engine generator as set forth in claim 9, wherein said various information further includes information concerning an opening degree of said throttle valve and information concerning a boosted pressure of said engine, and wherein said electronic controller further comprises:

output torque estimating means for estimating an output torque of said engine on the basis of said information concerning the opening degree of said throttle valve and said boosted pressure; and desired opening degree determining arithmetic means for determining the desired opening degree of said throttle valve through interpolation based on a relation between the demanded torque of said engine generator and the output torque of said engine;

wherein said opening degree correcting means controls the opening degree of said throttle valve toward said desired opening degree so that said engine rotation speed coincides with said desired engine rotation speed, when the output power of said engine generator fails to reach said rated power.

* * * * *